US010044840B2

(12) United States Patent
Dunsbergen et al.

(10) Patent No.: US 10,044,840 B2
(45) Date of Patent: Aug. 7, 2018

(54) ZERO CONFIGURATION OF AN ACCESS POINT CONNECTING TO A MESH NETWORK (71) Applicant: MERU NETWORKS, Sunnyvale, CA (US)

(72) Inventors: Berend Dunsbergen, San Jose, CA (US); Sung-Wook Han, Sunnyvale, CA (US); Nair Madhavan, Sunnyvale, CA (US); Narayanasami Vijayraghavan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/168,826

(22) Filed: May 31, 2016

(65) Prior Publication Data
US 2017/0347387 A1  Nov. 30, 2017

(51) Int. Cl.
H04W 40/24 (2009.01)
H04L 29/06 (2006.01)
H04L 12/933 (2013.01)
H04W 12/08 (2009.01)
H04W 24/02 (2009.01)
H04W 76/15 (2018.01)
H04W 88/08 (2009.01)
H04H 20/38 (2008.01)
H04L 29/12 (2006.01)
H04W 84/12 (2009.01)
H04W 48/10 (2009.01)
H04W 84/22 (2009.01)
H04W 92/12 (2009.01)

(52) U.S. Cl.
CPC .......... *H04L 69/22* (2013.01); *H04L 49/1584* (2013.01); *H04W 12/08* (2013.01); *H04W 24/02* (2013.01); *H04W 40/244* (2013.01); *H04W 76/15* (2018.02); *H04H 20/38* (2013.01); *H04L 61/6022* (2013.01); *H04W 48/10* (2013.01); *H04W 84/12* (2013.01); *H04W 84/22* (2013.01); *H04W 88/08* (2013.01); *H04W 92/12* (2013.01)

(58) Field of Classification Search
None
See application file for complete search history.

(56) References Cited

U.S. PATENT DOCUMENTS

| 9,467,895 | B2* | 10/2016 | Ram | H04W 28/065 |
| 9,622,263 | B2* | 4/2017 | Kaushik | H04W 74/008 |
| 2006/0114839 | A1* | 6/2006 | Meier | H04L 41/0843 |
| | | | | 370/254 |
| 2015/0124774 | A1* | 5/2015 | Kaushik | H04W 48/12 |
| | | | | 370/331 |

(Continued)

Primary Examiner — Alex Skripnikov
(74) Attorney, Agent, or Firm — Law Office of Dorian Cartwright; Dorian Cartwright (57) ABSTRACT A client access point joins a wireless network over a wireless connection in order to allow stations access to the wireless network. To join, the client access point (having a wireless connection to a mesh network) receives a beacon frame with unique identifiers of authorized client access points from a host access point (having a wired connection to the mesh network). Responsive to a unique identifier of the beacon frame matching the unique identifier of the client access point, a connection request for a connection is sent. A connection response confirming configuration of the client access point with the host access point in accordance is received.

12 Claims, 9 Drawing Sheets (56) References Cited

U.S. PATENT DOCUMENTS

| | | | | |
|---|---|---|---|---|
| 2015/0334632 A1* | 11/2015 | Rudolph | ............... | H04W 48/02 |
| | | | | 726/4 |
| 2016/0036825 A1* | 2/2016 | Manroa | ................ | H04L 63/105 |
| | | | | 726/1 |
| 2016/0100399 A1* | 4/2016 | Kaushik | .............. | H04W 74/008 |
| | | | | 370/338 |
| 2016/0105824 A1* | 4/2016 | Kaushik | ................ | H04W 36/14 |
| | | | | 370/331 |

* cited by examiner

ZERO CONFIGURATION OF AN ACCESS POINT CONNECTING TO A MESH NETWORK

FIELD OF THE INVENTION

The invention relates generally to networks, and more specifically, to automatically configuring an access point to a mesh network.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

Typically, before an access point is configured for connection to a mesh network, the access point is manually configured with configuration data. For example, an access point that has yet to connect to a mesh network is first connected to receive configuration data. The configuration data allows the access point to connect with a particular access point based specifically on where it will be deployed on a network.

Problematically, when a manually configured access point is moved to a different part of the mobile network to change coverage areas, the configuration data may no longer be valid at the new location, thereby requiring the access point to once again be manually configured.

What is needed is a technique to automatically configure an access point connecting to a wireless network from any location therein.

SUMMARY

To meet the above-described needs, methods, computer program products, and systems to connect an access point to a mesh network with zero configuration of the access point.

In an embodiment, a client (wireless) access point joins a wireless network over a wireless connection to reach a wired backbone. In turn, wireless stations across a mesh network can then use the client access point for access to the wired backbone, for example, to reach external network resources. A host (wireless) access point on the edge of the wireless network can facilitate wireless connectivity between the client access point and the wired backbone. To join, the client access point (having the wireless connection to the mesh network) receives a beacon frame with unique identifiers (e.g., MACs in a payload section of the beacon frame) of authorized client access points from a host access point (having the wired connection to the mesh network), as an invitation to join. Responsive to a unique identifier of the beacon frame matching the unique identifier of the client access point, a connection request for a connection is sent. A connection response confirming configuration of the client access point with the host access point in accordance is received.

In another embodiment, the host access point stores data about a network policy of the wireless network that includes unique identifiers of client access points authorized for connecting to the wireless network along with connected stations. A controller can send and update the network policy amongst host access points. The unique identifiers are broadcast in a payload portion of a beacon frame. The client access point persistently stores a unique identifier, such as a MAC or serial number.

Advantageously, the client access point can be automatically configured for a wireless connection to host access points from any location around a wireless network.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems to connect an access point to a mesh network with zero configuration of the access point. In other words, an access point can be connected to a mesh network out-of-the-box because pre-configuration is not necessary. Advantageously, access points can be quickly added to implement and reconfigure mesh networks.

Figure 1A:
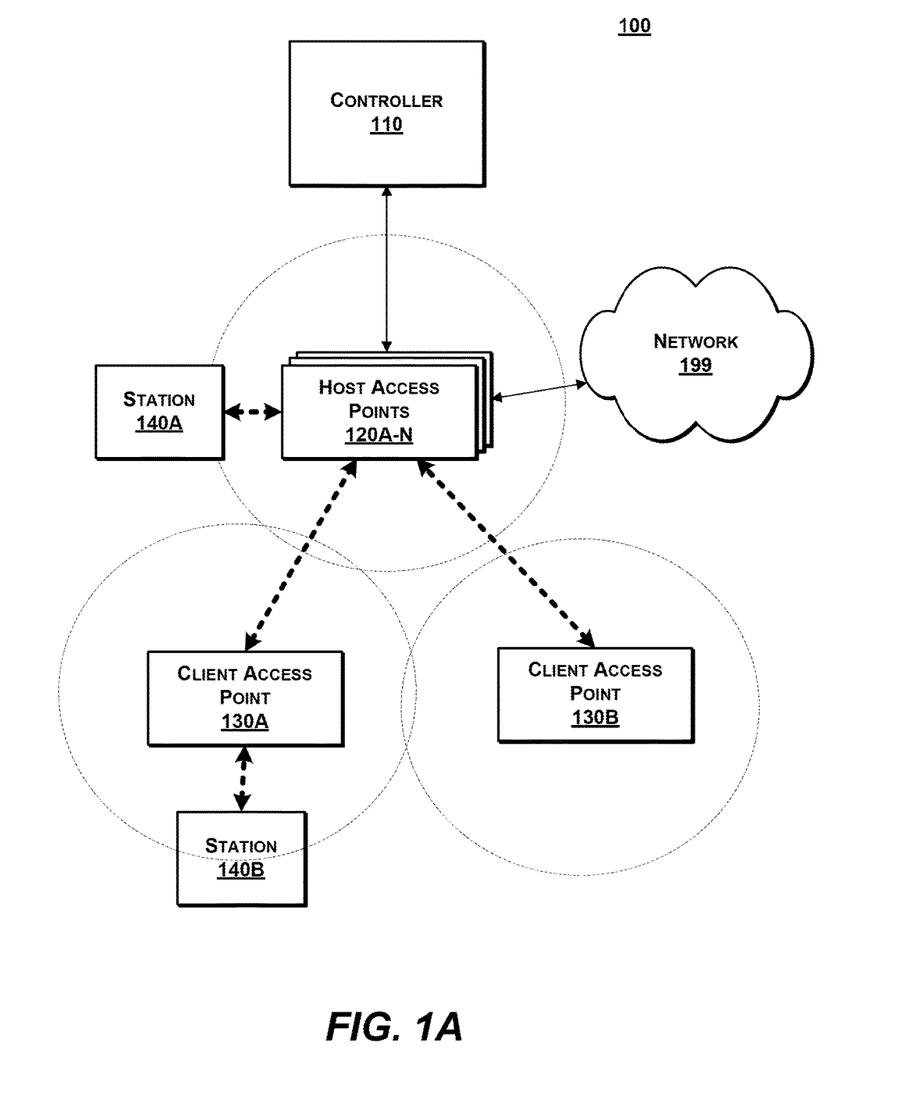
FIG. 1A is a schematic diagram illustrating a system to connect client access points to a mesh network without configuration of the client access points, according to one embodiment.

FIG. 1A is a schematic diagram illustrating a system to connect access points to a mesh network without configuration of the access points, according to one embodiment. The system comprises a controller 110, host (wired) access points 120A-N, client (wireless) access points 130A,130B, and wireless devices 110A,110B which are each processor-based computing devices. The components can be coupled to a network 199, such as the Internet, a local network or a cellular network, through any suitable wired (e.g., Ethernet) or wireless (e.g., Wi-Fi or 3G) medium, or combination. In a preferred embodiment, the controller 110 is connected to host access points 120A-N through a wired connection, or any other type of suitable communication connection. In turn, the host access points 120A-N are connected to client access points 130A,130B and station 140A over a wireless connection (e.g., IEEE 802.11). Additionally, the client access point 130B is connected to station 140B over a wireless connection. Other embodiments of communication channels are possible, including hybrid networks. Additional network components can also be part of the system 100, such as firewalls, virus scanners, routers, switches, application servers, databases, and the like. In general, the client access points 130A,130B connect to the mesh network without pre-configuration.

The controller 110 can communicate with each of the host access points 120A-N to manage integration of the client access points 130A,130B with the mesh network, among other things. Information which uniquely identifies client access points 130A,130B is received from an network administrator or automatically from another device. The controller 110 generates a network policy concerning a network topology or hierarchy, group membership, and connection parameters for distribution to the host access points 120A-N. More specifically, the controller 110 determines, in one embodiment, which of host access point 120A-N should seek a connection with client access points 130A,130B. Additional embodiments of the controller 130 are discussed below with respect to FIG. 7.

The host access points 120A-N include one or more individual access points that facilitate access for client access devices 130A,130B and wireless devices 140A,140B to the mesh network. The host access points 120A-N can be set-up in various configurations to provide wireless coverage areas across a corporate entity, municipality, or the like. The host access points 120A-N can, in turn, be connected to a wired hub, switch or router connected to the network 199. The functionality can also be incorporated into a switch or router. In one embodiment, the host access points 120A-N receive network policy information from the controller 110, including unique identifiers for client access points 130A, 130B that may seek a network connection. The host access points 120A-N then broadcast beacon frames that include unique identifiers supplied by the controller 110 to allow connections by the client access points 130A,130B. Embodiments of the access point are set forth below in FIG. 1C.

The client access points 130A,130B can be identical or similar devices to the host access points 120A-N. Once a client access point 130A,130B is added to a network policy administered by, for example, the controller 110, the client access point 130A,130B can wirelessly connect anywhere in the network without configuration. The client access points 130A,130B receive beacon frames from one or more of the host access points 120A-N. If more than one beacon frame is received, the client access points 130A,130B are at liberty to select a desired connection. In an embodiment, the client access points 130A,130B can connect to the mesh network without itself being pre-configured by an administrator with network information that assigns a host access point and other parameters. After connecting, the client access points 130A,130B transmit their own beacon frames with corresponding BSSIDs to allow connections with wireless devices. The controller 110 can manage the client access points 130A,130B in providing virtual cell and virtual port service modes to connected station. Virtual cell service mode utilizes a persistent BSSID as a station moves around a wireless network, and virtual port service mode utilizes a per-station unique BSSID for a one-to-one correspondence between the controller 110 network policy and an individual station. In some embodiments, the client access point 130A, 130B serves as a host for another client access point connecting to the mesh network.

The station 140A,140B can be, for example, a personal computer, a laptop computer, a tablet computer, a smart phone, a mobile computing device, a stationary computing device, an Internet appliance, or the like. The station 140B receives beacon frames from the client access point 130B which include an BSSID to identify the client access point 130B. The station 140A receives beacon frames from one of the host access points 120A-N. Beacon frames can be received from more than one access point. In response, the station 110A-110N selects which access point meets its needs and sends a probe response. Embodiments of the stations 140A,140B are described more fully below in association with FIG. 1D.

Figure 1B:
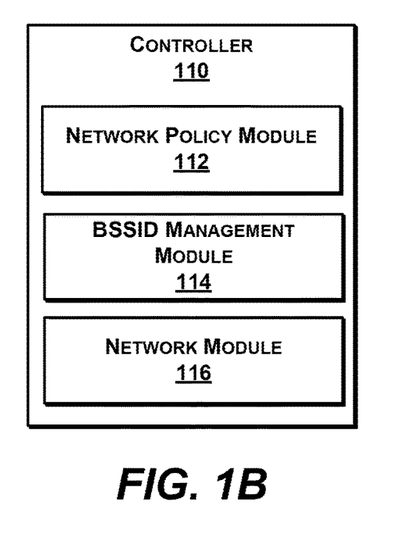
FIG. 1B is a more detailed block diagram illustrating a controller of the system of FIG. 1A, according to one embodiment.

FIG. 1B is a more detailed block diagram illustrating a controller 110 of the system 100, according to one embodiment. The controller 110 comprises a network policy module 112, a BSID management module 114, and a network module 116. The components can be implemented in hardware, software, or a combination of both.

The network policy module 112 sets various policies for a wireless network, including which client access points are authorized for connecting. A network policy can be an automated script or manually set by a network administrator. The network policy can also define configuration hierarchies and sub-groups for client access points. Further, the network policy can define whether a host access point, client access point or station is assigned a BSSID that is unique, shared, or persistent across different access points. The controller 110 distributes the network policy, or network policies, to host access points that are being managed by the controller 110.

The BSSID management module 114 assigns particular BSSIDs to access points. As a wireless device travels around an aggregate coverage area of the access points, the BSSID can remove a BSSID from one access point, and assign it to a different access point to continue serving the wireless device. Besides locations, the BSSID management module 114 can make changes due to load balancing, type of network traffic, type of device, user privileges, and the like.

The network module 116 can manage connection to other devices on a network. For example, network module 116 can provide Ethernet ports for a wired connection to host access points through a local (or remote) network.

Figure 1C:
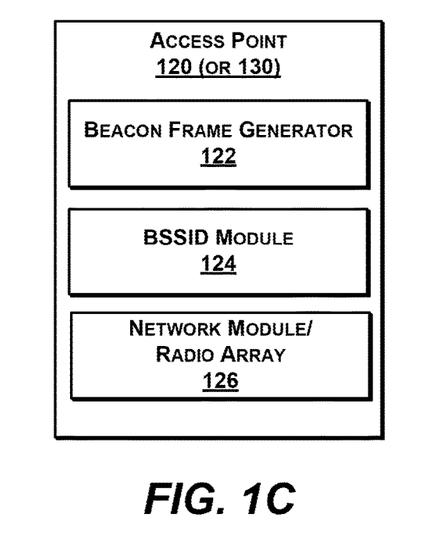
FIG. 1C is a more detailed block diagram illustrating an access point (host or client access point) of the system of FIG. 1A, according to one embodiment.

FIG. 1C is a more detailed block diagram illustrating an access point 110 of the system 100, according to one embodiment. The access point 120 comprises a beacon frame generator 122, a BSSID module 124, and a network module with a radio array 126. The components can be implemented in hardware, software, or a combination of both.

The beacon frame generator 122 manages the formation and broadcast of beacon frames. The beacon frames advertise the availability of connections through a particular BSSID. Different beacon frames from a single access point can have different BSSIDs in some embodiments. Also, a single beacon frame can have multiple BSSIDs in some other embodiments. In other embodiments, particular BSSIDs are made available to particular client access points or stations.

The BSSID module 124 tracks BSSID assignments to connected wireless devices. Some embodiments assign a unique BSSID to each wireless device which allows device level control of uplink access. The BSSID can be received from a controller 110 that is in communication with other access points.

The network module/radio array 126 can be a combination of wired and wireless connection mediums. For example, Ethernet ports or telephone jacks can provide a wired connection to a network and/or the controller 110, while antennas provide a wireless connection to client access points or stations. The radio array can include one or more transmit (Tx) and receive (Rx) antennas for communication with the physical layer. Some wireless devices 110 include separate antennae for IEEE 802.11a, IEEE 802.11b and IEEE 802.11n. Other implementations include several antenna dedicated for separate transmit and receive paths using the MIMO functionality of IEEE 802.11n. The network module/radio array 126 can also use a TCP/IP stack or other technique to pack data from the network application 142 for network transfer and to unpack data received therefrom.

Figure 1D:
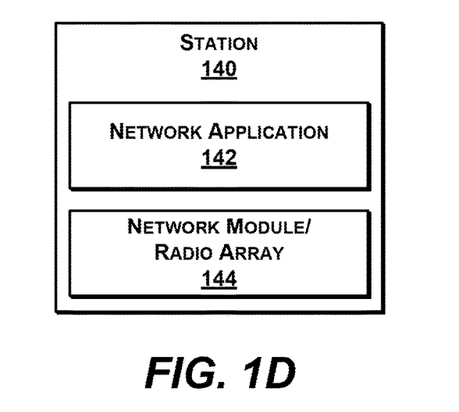
FIG. 1D is a more detailed block diagram illustrating a station of the system of FIG. 1A, according to one embodiment.

FIG. 1D is a more detailed block diagram illustrating a station of the system 100, according to one embodiment. The station 110 comprises a network application 142, a network module/radio array 144. The components can be implemented in hardware, software, or a combination of both.

The network application 142 can be any application executing on the station 110 that makes use of network access in operation. Examples of the network application 142 include a network browser, a VOIP telephone service, a streaming video player, a database viewer, a VPN client, and the like.

The network module/radio array 144 can be similar to the network module/radio array 126 of the access point 120.

Figure 2:
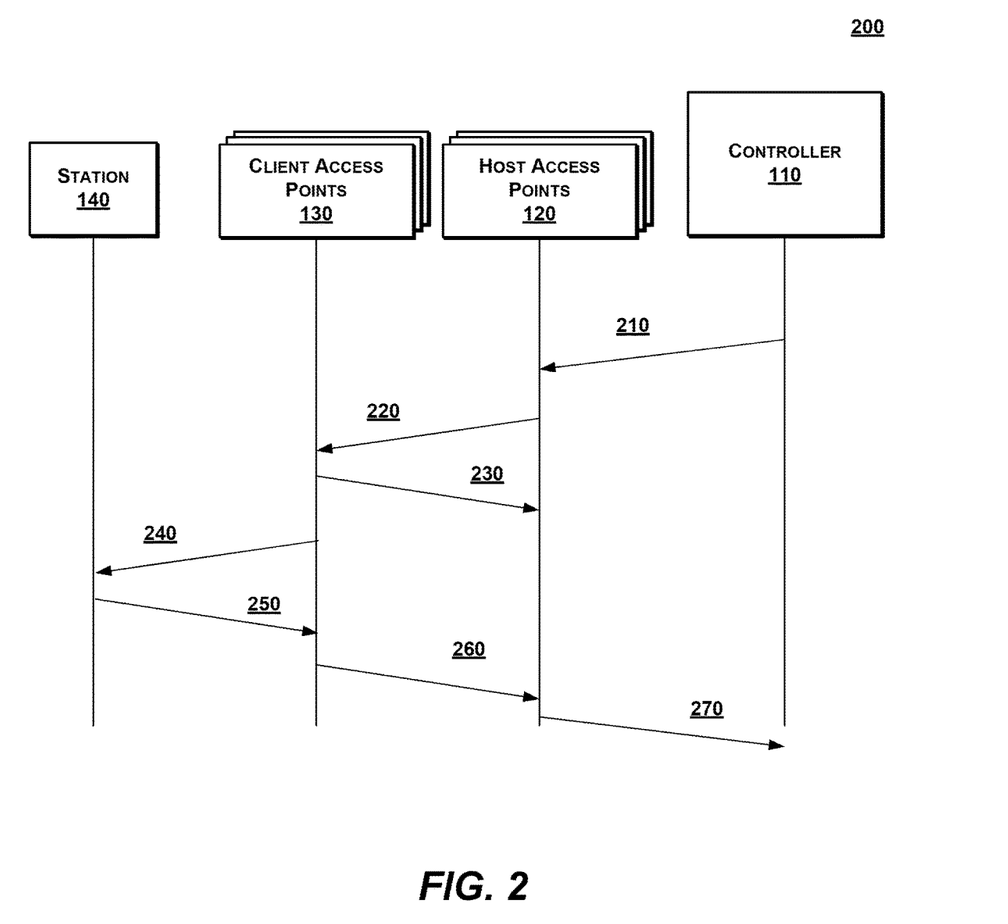
FIG. 2 is a sequence diagram illustrating interactions between components in the system of FIG. 1, according to one embodiment.

FIG. 2 is a sequence diagram illustrating interactions between components in the system of FIG. 1, according to one embodiment. Methods occurring within the components of FIG. 2 are illustrated in FIGS. 4-7.

At interaction 210, the controller 110 distributes network policy, including unique identifiers, to the host access points 120A-N. At interaction 220 the host access points 120A-N sends beacon frames over a respective coverage area to seek client access points 130A,130B needing to connect to the mesh network. At interaction 230, the client access points 130A,130B send probe responses to host access points 120A-N to initiate a connection.

Next, at interaction 240, client access points 130A,130B transmit beacon frames to seek stations 140A,140B needing to connect to the mesh network. At interaction 250, the stations 140A,140B transmit a probe response to initiate a connection with a client access point 130A,130B.

Optionally, at interaction 260, the client access points 230 notify the host access points 120 of downstream connections, and at interaction 270, the host access points 120A-N notify the controller 110 of devices that are connected downstream.

The illustrated interactions 200 of FIG. 2 are not intended to be limiting. As such, the interactions 210 to 250 can be a portion of steps from a longer process. Further, the interactions 220 and 240 in which an access point sends a beacon can be continuously repeated.

Figure 3:
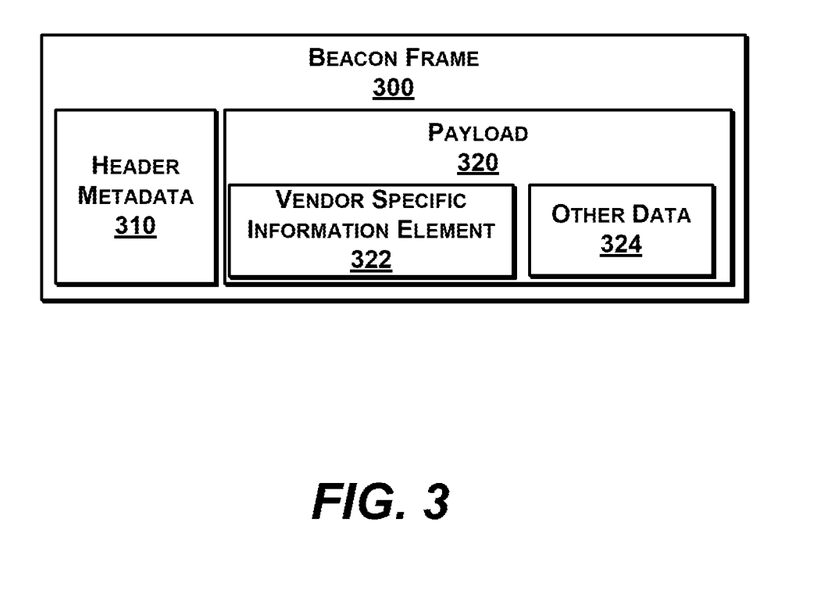
FIG. 3 is a block diagram illustrating a sample beacon frame with a unique identifier in the payload, according to one embodiment.

FIG. 3 is a block diagram illustrating a sample beacon frame 300, according to one embodiment. The beacon frame 300 includes header metadata 310 and a payload 320.

The header metadata 310 can include fields such as source address, destination address, and other headers that provide routing and format information. The payload 320 includes a vender specific information element, or any other suitable field to store the unique identifier.

Figure 4:
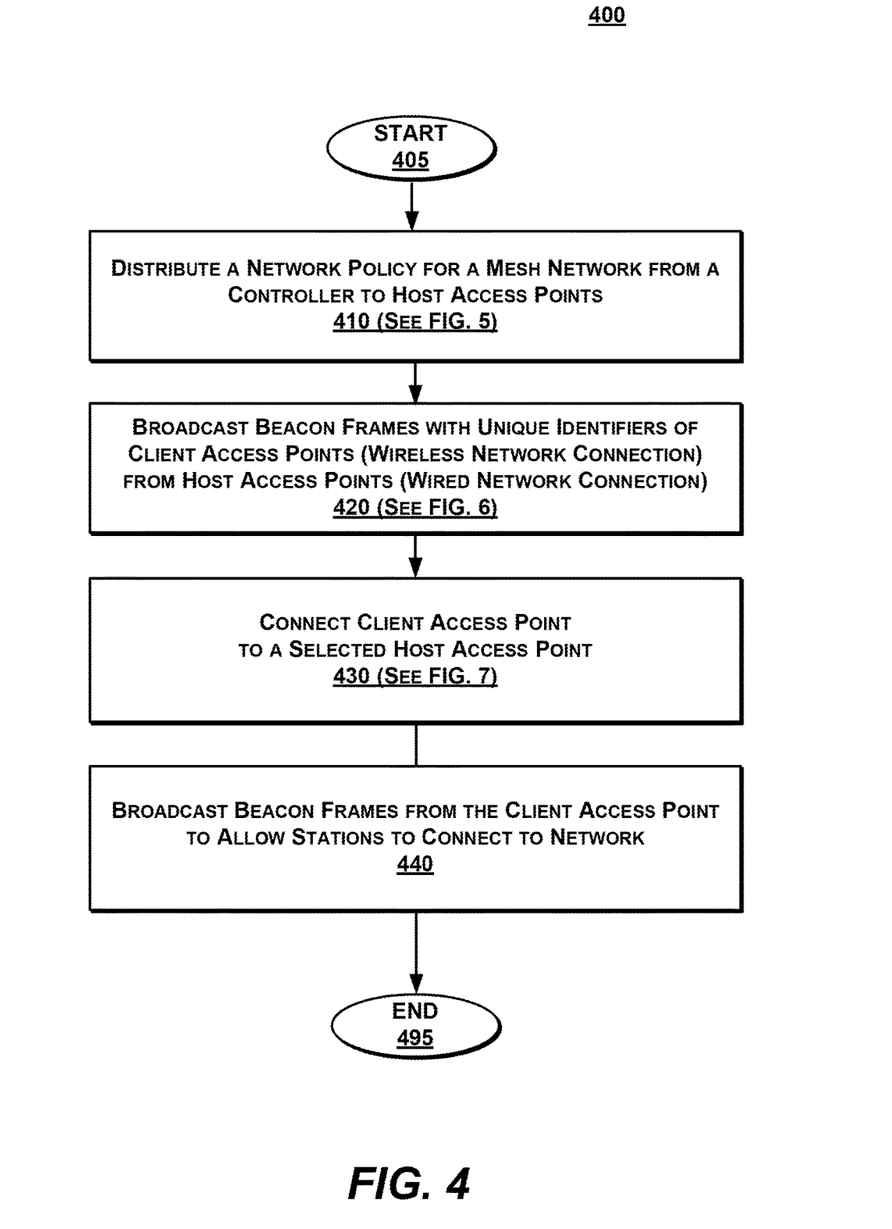
FIG. 4 is a flow diagram illustrating a method for connecting a client access point to a mesh network without configuration of the client access points, according to one embodiment.

FIG. 4 is a flow diagram illustrating a method 400 for a zero configuration access point connecting to a mesh network, according to one embodiment. As a result, a client access point can connect to the mesh network without first being configured with network information.

At step 410, a network policy for a mesh network is distributed from a controller to one or more host access points. In one embodiment, the network policy includes unique identifiers for client access points authorized to connect with the mesh network. In another embodiment, the network policy includes additional information concerning the access point, such as a network topology or a network hierarchy including the access point, connection parameters for the access point, characteristics of the access point, and the like. Additional details associated with step 410 are discussed below in association with FIG. 5.

At step 420, a host access point distributes beacon frames with unique identifiers to client access points. Once the unique identifiers are received from the controller, the host access points can wirelessly broadcast (or unicast) to client access points within range. In the present embodiment, a beacon frame is modified, but in other embodiments, other types of frames can be utilized to advertise unique identifiers. Additional details associated with step 420 are discussed below in association with FIG. 6.

Figure 7:
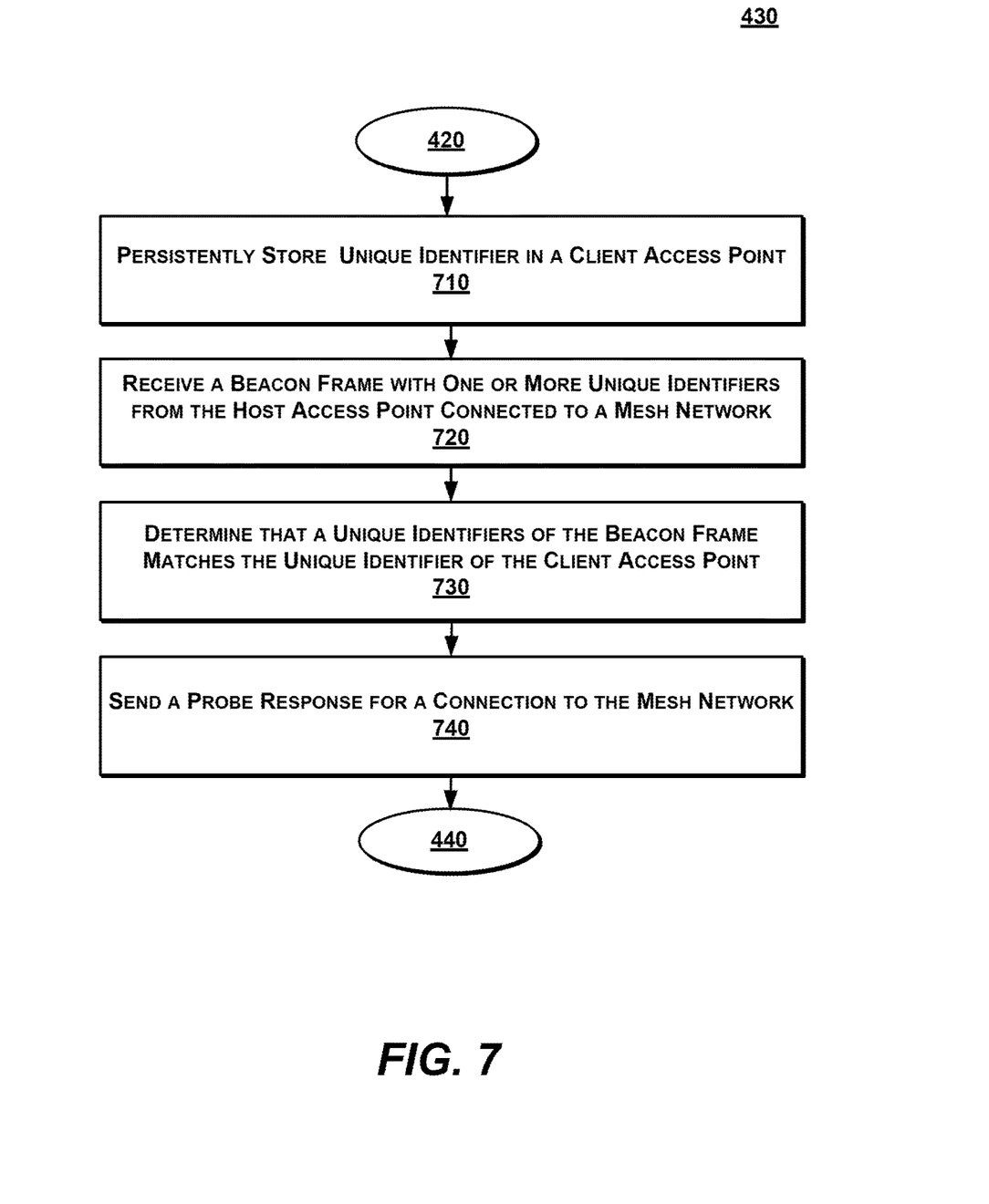
FIG. 7 is a flow diagram illustrating a method for connecting client access points to a mesh network for the method of FIG. 4A, according to one embodiment.

At step 430, a client access point connects to a host access point by sending a connection response to one of the received beacons, as described more fully with respect to FIG. 7.

At step 440, the client access point broadcasts beacon frames to wireless devices seeking a connection to the mesh network. After network devices are connected to the client access points, the client access point facilitates data transfers with the mesh network via an associated host access point.

In one embodiment, the client access point is connected in a virtual cell service mode. As discussed, a controller manages, and transfers, BSSIDs across access points. As a result, when the client access point is moved to a different location, the BSSID, network policy, and unique identifier is all made available to the new host access point for a zero configuration connection. Likewise, stations can be handed off to a different client access points (or host access points) without any interruption of network service.

Figure 5:
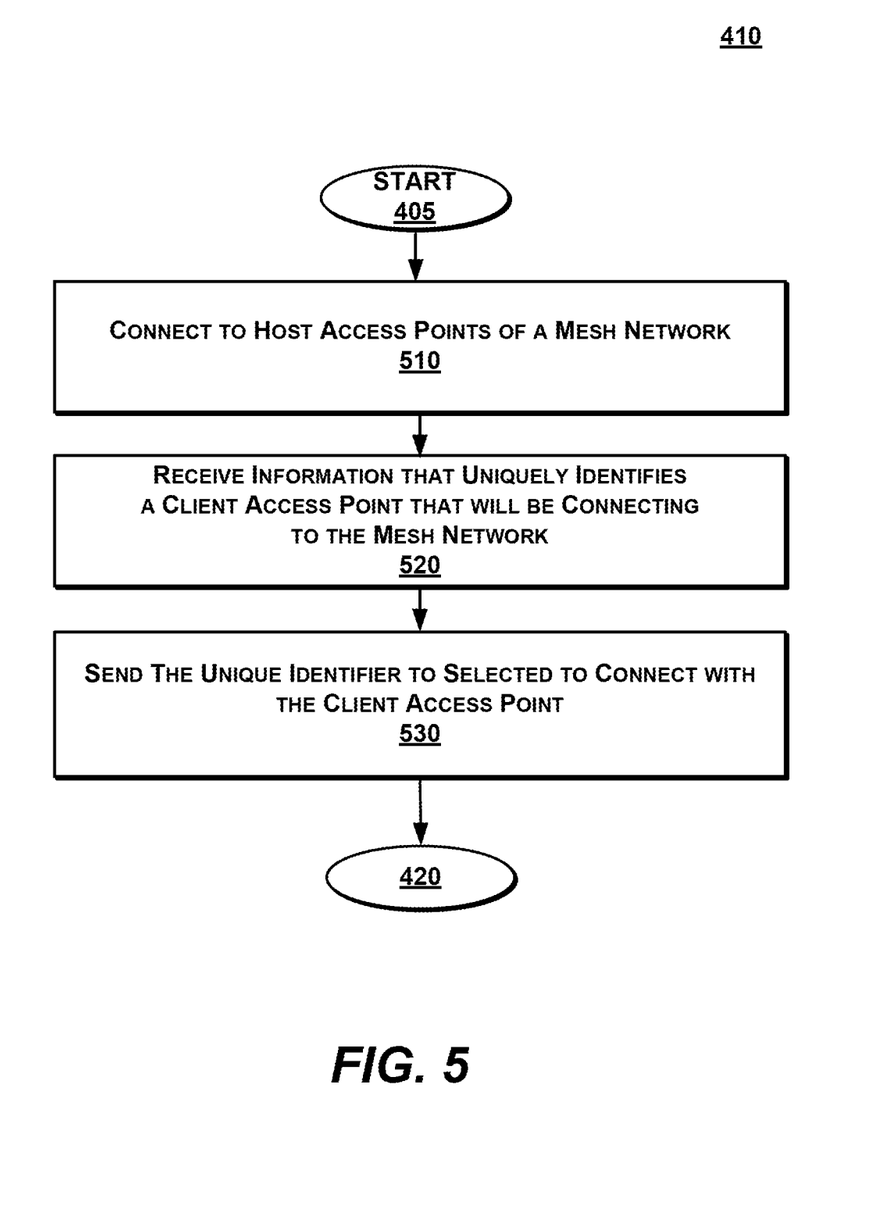
FIG. 5 is a flow diagram illustrating a method for distributing a network policy for a mesh network to host access points from a controller for the method of FIG. 4A, according to one embodiment.

FIG. 5 is a flow diagram illustrating a method 500 for sending a network policy for a mesh network to host access points, according to one embodiment.

At step 510, a controller connects to host access points. In one embodiment, the controller connects to the host access points over a wired network. The controller is able to manage various aspects of the host access points, the client access points, and the wired devices. For example, the controller can manage which host access point should respond to a client access point communication, when the client access point is with range of more than one.

At step 520, the controller receives information that uniquely identifies one or more client access points that will be connecting to the mesh network. A unique identifier can be a set of characters persistently stored on a client access point such as a MAC address, a serial number, or other identification that is unique on the mesh network. An administrator can use, for instance, a network administration application or operating system such as System Director by Meru Networks of Sunnyvale, Calif., to configure the mesh network. The client access point can be associated with one more particular host access points, or all of them. The host access point are selected based on a desired coverage are of the mesh network, an expected installation location of the client access network, or all host access points are selected to allow the client access point to join the mesh network without limitation. In some embodiments, parameters such as uplink access control, available service types, device characteristics, or device history can be associated with the client access point.

At step 530, the controller sends a unique identifier for the authorized client access point to the host access points. The network administration application can store the unique identifier of the client access point along with identifiers of associated host access point for storage in a network policy table. Then, network packets are generated and sent to the associated host access points.

As an optional step (not pictured), the controller receives confirmation that a client access point has connected to a host access network over a mesh network. Also, characteristics of the connection can be provided. As a result, the network administration application can update a visual depiction of the mesh network to include the newly connected client access point, and descendant connections.

Figure 6:
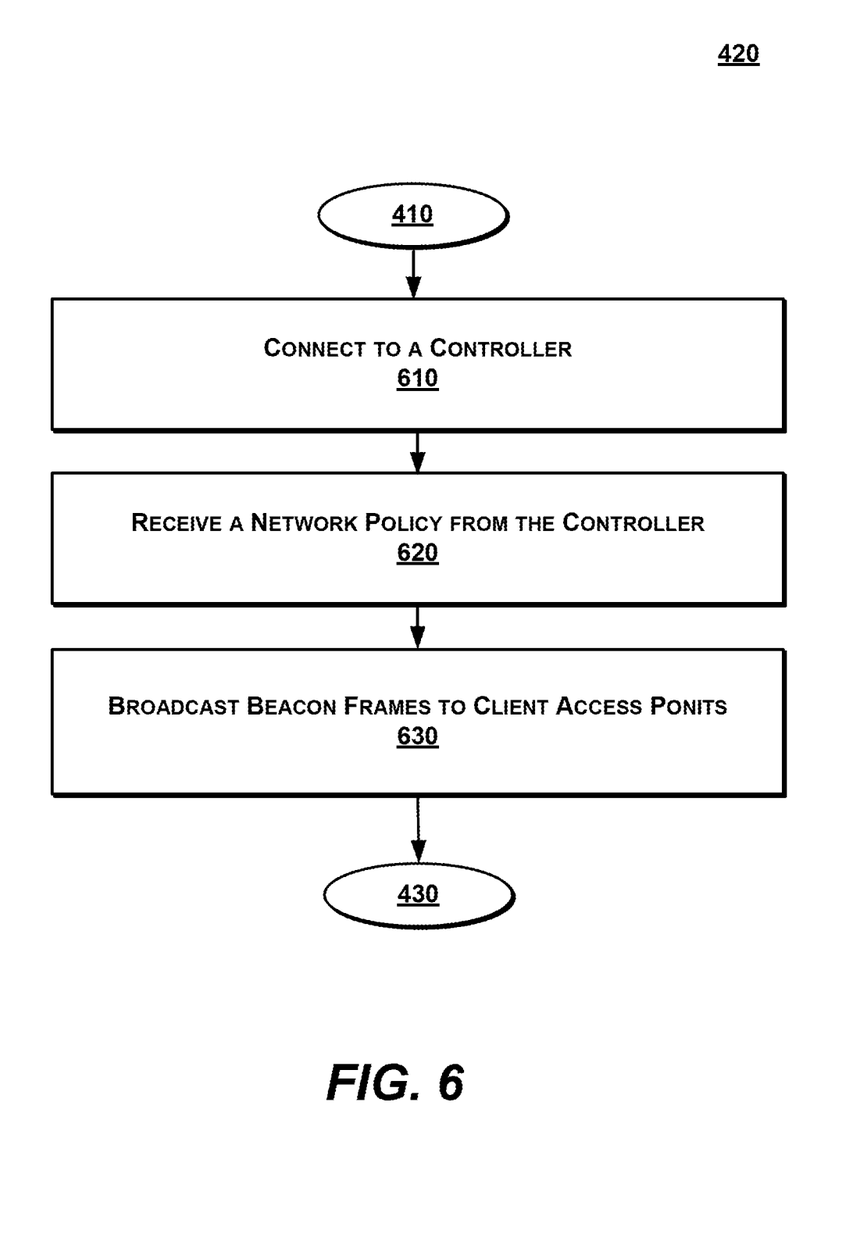
FIG. 6 is a flow diagram illustrating a method for transmitting beacon frames to client access points from a host access point for the method of FIG. 4A, according to one embodiment.

FIG. 6 is a flow diagram illustrating a method 600 for a host access point distributing beacon frames with unique identifiers to client access points. The distribution can be a broadcast, a unicast, or any other type of communicative connection to client access points from the host access points. The beacon frames include unique identifiers within the payload portion of a network packet as shown in FIG. 3. In one embodiment, the unique identifiers are distinct from header information such as source and destination addresses.

At step 610, a host access point connects to a controller that manages a set of host access points.

At step 620, the host access point receives a network policy from the controller. As discussed above, the host access point receives network policy instructions from a controller, such as which client access points to allow a connection, which wireless devices to respond to, and the like.

At step 630, the host access point broadcasts beacon frames with unique identifiers in accordance with the network policy. The host access point uses beacon frames to advertise its presence to wireless devices within range (e.g., one or more BSSIDs are provided to allow a wireless device to identify the host access point). In one embodiment, the beacon frames are modified to also include unique identifiers of client access points that have been associated with the host access point. A vendor specific information element within a payload portion of the beacon frame is recognized by both the host and client access points as being located at a certain offset (see FIG. 3). In some embodiments, multiple unique identifiers are provided.

FIG. 7 is a flow diagram illustrating a method 700 for sending a beacon response from the client access point to a selected host access point, according to one embodiment.

At step 710, a unique identifier is persistently stored in a client access point. The unique identifier can include a MAC address, or any other identifier that is unique to the mesh network. Some client access points can store multiple unique identifiers connected with, for instance, different network cards, different processors, or different applications.

At step 720, a beacon frame is received from a host access point connected to a mesh network at the client access point. The client access point is deployed in the mesh network within radio range of at least one host access point. A network administrator can use a sensor to determine a signal strength and source of the signal to determine an optimal location for deployment within the mesh network. The device is powered on to begin boot operations and to seek a network connection. Beacon frames are received and masked to check for unique identifiers at a pre-specified location such as the vendor specific information element.

At step 730, the client access point determines that a unique identifier within a beacon frame matches the persistently stored unique identifier of the device. In response, a BSSID (or other identifier) of the host access point is also determined. In one embodiment, beacon frames from more than one host access point offer a connection. The client access point makes a selection, based on implementation specific details, and transmits a beacon response to the selected host access point with the BSSID.

At step 740, a connection request is received by the host access point. A probe response sent back from the host access point of notifies the client access point of an authorized connection. Optionally, the host access point can then notify the controller of the connection by providing the BSSID and the unique identifier.

Figure 8:
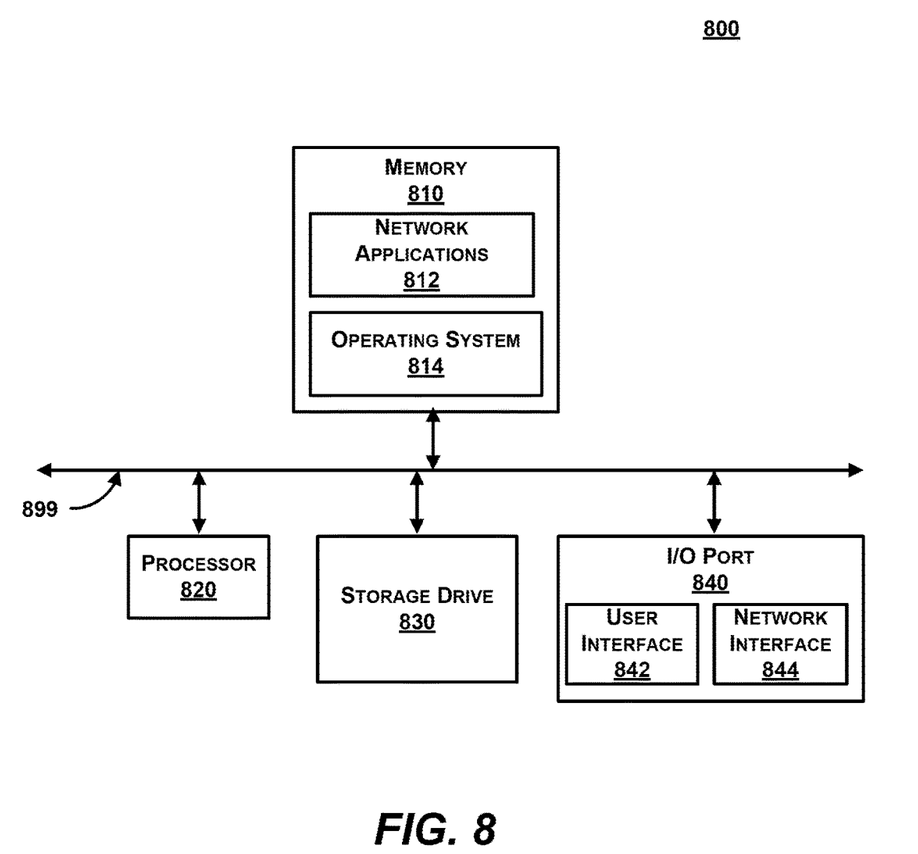
FIG. 8 is a block diagram illustrating an exemplary computing device for use in the system of FIG. 1A, according to one embodiment.

FIG. 8 is a block diagram illustrating an exemplary computing device 1000 for use in the system 100 of FIG. 1, according to one embodiment. The computing device 800 is an exemplary device that is implementable for each of the components of the system 100, including the wireless device 110, the access point 120, and the controller 130. Additionally, the system 100 is merely an example implementation itself, since the system 100 can also be fully or partially implemented with laptop computers, tablet computers, smart cell phones, Internet appliances, and the like.

The computing device 800, of the present embodiment, includes a memory 810, a processor 820, a hard drive 830, and an I/O port 840. Each of the components is coupled for electronic communication via a bus 899. Communication can be digital and/or analog, and use any suitable protocol.

The memory 810 further comprises network applications 812 and an operating system 814. The network applications 812 can include the modules of network applications, access points, or controllers. Other network applications can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 810 or the hard drive 1030

The storage drive 830 can be any non-volatile type of storage such as a magnetic disc, EEPROM, Flash, or the like. The storage drive 830 stores code and data for applications.

The I/O port 840 further comprises a user interface 1042 and a network interface 844. The user interface 842 can output to a display device and receive input from, for example, a keyboard. The network interface 844 connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. In a wireless access point having a wireless connection to a data network, a computer-implemented method for providing connectivity to stations on a wireless mesh portion of the data network through a wired access point connected to a wired backbone portion of the data network, the method comprising:

persistently storing, in a memory element of the wireless access point, a unique identifier in the wireless access point that provides connectivity to the wireless mesh portion of the data network;

receiving a beacon frame with one or more unique identifiers from the wired access point connected to the wired access point, at a network interface device of the wireless access point, the wired access point storing data about a network policy of the mesh network which includes authorized network devices and a corresponding one of the one or more unique identifiers, the network policy distributed by a controller device managing a plurality of access points including the wired access point, wherein the one or more unique identifiers is embedded in a payload portion of the received beacon frame;

comparing, with a processor of the wireless access point, the one or more unique identifiers from the received beacon frame to the persistently-stored unique identifier;

responsive to a match in the comparing step, sending, from the network interface device, a connection request for a connection to the wired access point;

receiving, at the network interface device, a connection response confirming configuration of a client access point with a hosting access point in accordance with the network policy;

receiving, at the network interface device, one or more BSSIDs (basic service set identifiers) from a control element; and connecting, at the network interface device, with at least one wireless station by broadcasting the one or more BSSIDs assigned by the control element.

2. The method of in claim 1, wherein the step of sending the connection request is responsive to one of a power up or a reset in addition to being responsive to a match in the comparing step.

3. The method of claim 1, wherein the step of sending the connection request is not responsive to any previous configuration of the wireless access point to the wired access point or the data network.

4. The method of claim 1, wherein the connection request comprises the one or more unique identifiers corresponds to a vendor specific information element.

5. The method of claim 1, wherein the one or more BSSIDs assigned by the control element to the wireless access point is the same as a BSSID assigned to the wired access point.

6. The method of claim 1, wherein the one or more BSSIDs assigned by the control element to the wireless access point is the distinct from a BSSID assigned to the wired access point.

7. The method of claim 1, wherein the one or more unique identifiers comprises a MAC address.

8. The method of claim 1, wherein the network policy comprises at least one of a group membership and a network topology.

9. The method of claim 1, further comprising:

receiving a plurality of beacon frames from a plurality of wired access points; and determining which wired access point to use for connection of the mesh network.

10. The method of claim 1, wherein the connected wireless station is switched to connecting with the wired access point for access to the data network.

11. The method of claim 1, comprising:
wherein the wireless connection operates according to an IEEE 802.11-type standard.

12. A non-transitory computer-readable medium storing instructions that when executed by a processor of a wireless access point, performs a method for connecting an access station to a network over a wireless connection, the method comprising:
persistently storing, in a memory element of the wireless access point, a unique identifier in the wireless access point that provides connectivity to the wireless mesh portion of the data network;
receiving a beacon frame with one or more unique identifiers from the wired access point connected to the wired access point, at a network interface device of the wireless access point, the wired access point storing data about a network policy of the mesh network which includes authorized network devices and a corresponding one of the one or more unique identifiers, the network policy distributed by a controller device managing a plurality of access points including the wired access point, wherein the one or more unique identifiers is embedded in a payload portion of the received beacon frame;
comparing, with a processor of the wireless access point, the one or more unique identifiers from the received beacon frame to the persistently-stored unique identifier;
responsive to a match in the comparing step, sending, from the network interface device, a connection request for a connection to the wired access point;
receiving, at the network interface device, a connection response confirming configuration of a client access point with a hosting access point in accordance with the network policy;
receiving, at the network interface device, one or more BSSIDs (basic service set identifiers) from a control element; and
connecting, at the network interface device, with at least one wireless station by broadcasting the one or more BSSIDs assigned by the control element.

\* \* \* \* \*

UNITED STATES PATENT AND TRADEMARK OFFICE
CERTIFICATE OF CORRECTION

PATENT NO. : 10,044,840 B2  
APPLICATION NO. : 15/168826  
DATED : August 7, 2018  
INVENTOR(S) : Berend Dunsbergen et al.

Page 1 of 1

It is certified that error appears in the above-identified patent and that said Letters Patent is hereby corrected as shown below:

On the Title Page

Item (72), The third named inventor should read:
Madhavan Nair, Sunnyvale, CA (US)

Signed and Sealed this
Sixteenth Day of April, 2019

Andrei Iancu
*Director of the United States Patent and Trademark Office*